United States Patent
Kamata et al.

(10) Patent No.: US 10,446,866 B2
(45) Date of Patent: Oct. 15, 2019

(54) PROTON CONDUCTOR

(71) Applicant: Panasonic Intellectual Property Management Co., Ltd., Osaka (JP)

(72) Inventors: Tomoya Kamata, Osaka (JP); Tomohiro Kuroha, Osaka (JP); Yukimune Kani, Osaka (JP); Hiroshige Matsumoto, Fukuoka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 199 days.

(21) Appl. No.: 15/150,318

(22) Filed: May 9, 2016

(65) Prior Publication Data

US 2016/0344054 A1 Nov. 24, 2016

(30) Foreign Application Priority Data

May 20, 2015 (JP) .................................. 2015-103085

(51) Int. Cl.
*H01M 8/1253* (2016.01)
*H01B 1/12* (2006.01)
(Continued)

(52) U.S. Cl.
CPC ........ *H01M 8/1253* (2013.01); *C01G 25/006* (2013.01); *C04B 35/486* (2013.01);
(Continued)

(58) Field of Classification Search
CPC ....... H01M 8/1253; H01M 2300/0077; H01M 2008/1293; C04B 35/638; C04B 35/6262; C04B 35/486; C04B 35/645; C04B 35/62695; C04B 35/62675; C04B 35/62655; C04B 2235/79; C04B 2235/786; C04B 2235/785; C04B 2235/768; C04B 2235/604; C04B 2235/449;
(Continued)

(56) References Cited

U.S. PATENT DOCUMENTS 6,517,693 B2 * 2/2003 Taniguchi ............ C01G 25/006
204/295

FOREIGN PATENT DOCUMENTS

JP 2009-023883 2/2009

OTHER PUBLICATIONS

Sun, Wenping, et al. "An Easily Sintered, Chemically Stable, Barium Zirconate-Based Proton Conductor for High-Performance Proton-Conducting Solid Oxide Fuel Cells." Advanced Functional Materials 24.36 (2014).*

(Continued)

*Primary Examiner* — Stephen J Yanchuk
*Assistant Examiner* — Philip A. Stuckey
(74) *Attorney, Agent, or Firm* — McDermott Will & Emery LLP

(57) ABSTRACT

A proton conductor is a proton conductor represented by a composition formula of $BaZr_{1-x-y}Y_xIn_yO_3$, and x and y in the composition formula satisfy $0<y\leq0.013$ and $0<x+y<0.5$. A small amount of In is added to the composition in a predetermined range, whereby a resistance of the crystal grain boundary of the proton conductor can be decreased so as to compensate for or even exceed the increase in resistance in the crystal gains of the proton conductor caused by the addition of In, and as a result, the entire resistance can be decreased.

1 Claim, 2 Drawing Sheets

(51) Int. Cl.
*C01G 25/00* (2006.01)
*C04B 35/626* (2006.01)
*C04B 35/645* (2006.01)
*C04B 35/486* (2006.01)
*C04B 35/638* (2006.01)
*H01M 8/124* (2016.01)

(52) U.S. Cl.
CPC .... *C04B 35/6262* (2013.01); *C04B 35/62655* (2013.01); *C04B 35/62675* (2013.01); *C04B 35/62695* (2013.01); *C04B 35/638* (2013.01); *C04B 35/645* (2013.01); *H01B 1/122* (2013.01); *C04B 2235/3215* (2013.01); *C04B 2235/3225* (2013.01); *C04B 2235/3286* (2013.01); *C04B 2235/443* (2013.01); *C04B 2235/449* (2013.01); *C04B 2235/604* (2013.01); *C04B 2235/768* (2013.01); *C04B 2235/785* (2013.01); *C04B 2235/786* (2013.01); *C04B 2235/79* (2013.01); *H01M 2008/1293* (2013.01); *H01M 2300/0077* (2013.01); *Y02E 60/525* (2013.01); *Y02P 70/56* (2015.11)

(58) Field of Classification Search
CPC ...... C04B 2235/443; C04B 2235/3286; C04B 2235/3225; C04B 2235/3215; C01G 25/006; H01B 1/122; Y02P 70/56; Y02E 60/525

See application file for complete search history.

(56) References Cited

OTHER PUBLICATIONS

Hsu, Kai-Ti, et al. "Evolution of the sintering ability, microstructure, and cell performance of $Ba_{0.8}Sr_{0.2}Ce_{0.8-x-y}Zr_yIn_xY_{0.2}O_{3-\sigma}$ (x= 0.05, 0.1 y= 0, 0.1) proton-conducting electrolytes for solid oxide fuel cell." Journal of the Ceramic Society of Japan 123.1436 (Apr. 2015).*

Ahmed, Istaq, et al. "Synthesis and structural characterization of perovskite type proton conducting $BaZr_{1-x}In_xO_{3-\sigma}$ ($0.0 \leq x \leq 0.75$)." Solid State Ionics 177.17-18 (2006): 1395-1403. (Year: 2006).*

Jian Wu, "Defect Chemistry and Proton Conductivity in Ba-based Perovskites", Ph. D. thesis, California Institute of Technology, 2005 (Defended Oct. 27, 2004).

Liu Ting Yu, "Proton Conduction of Indium and Yttrium Doped Barium Zirconate", M20094314, KAIST, 2011.

* cited by examiner

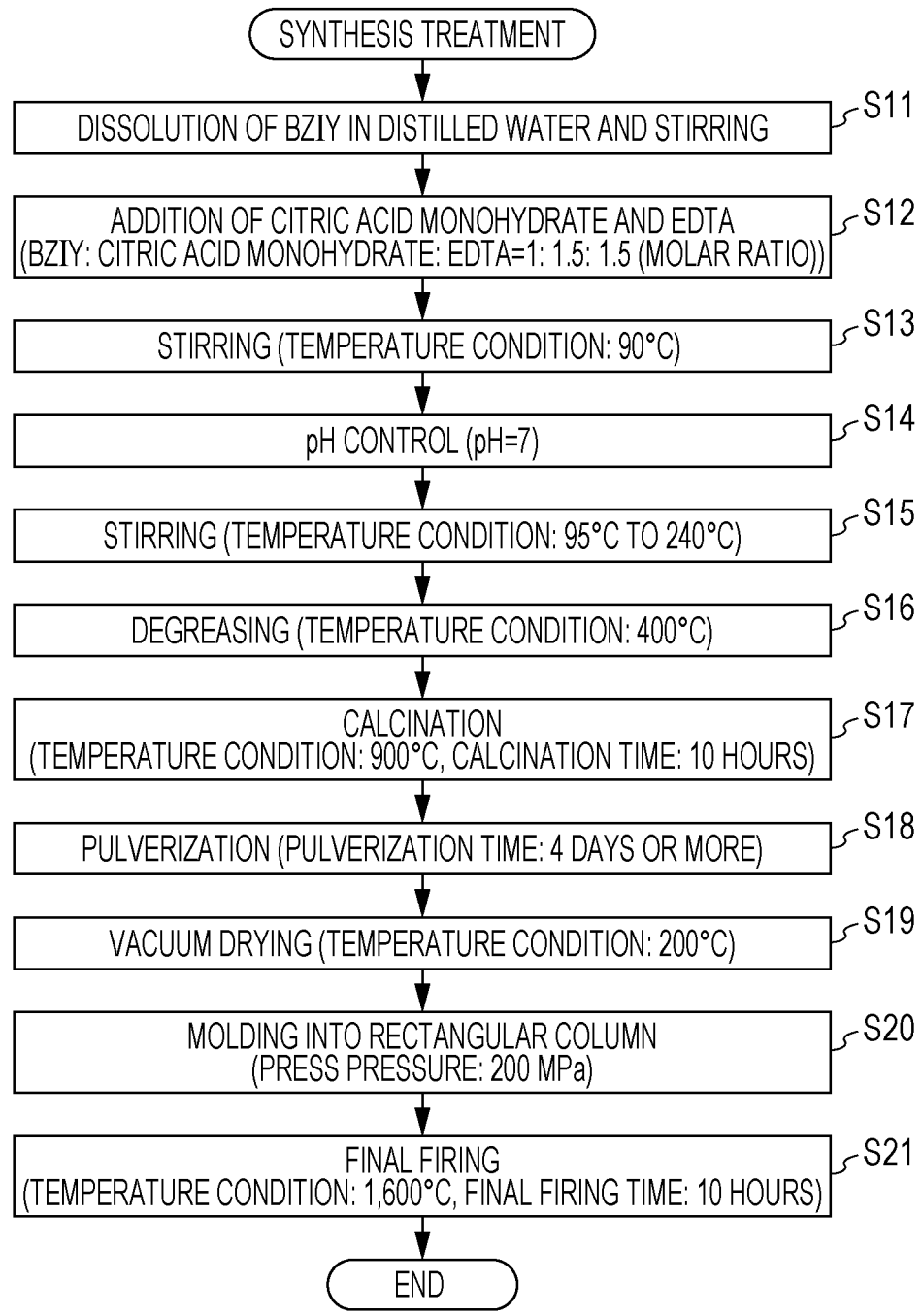

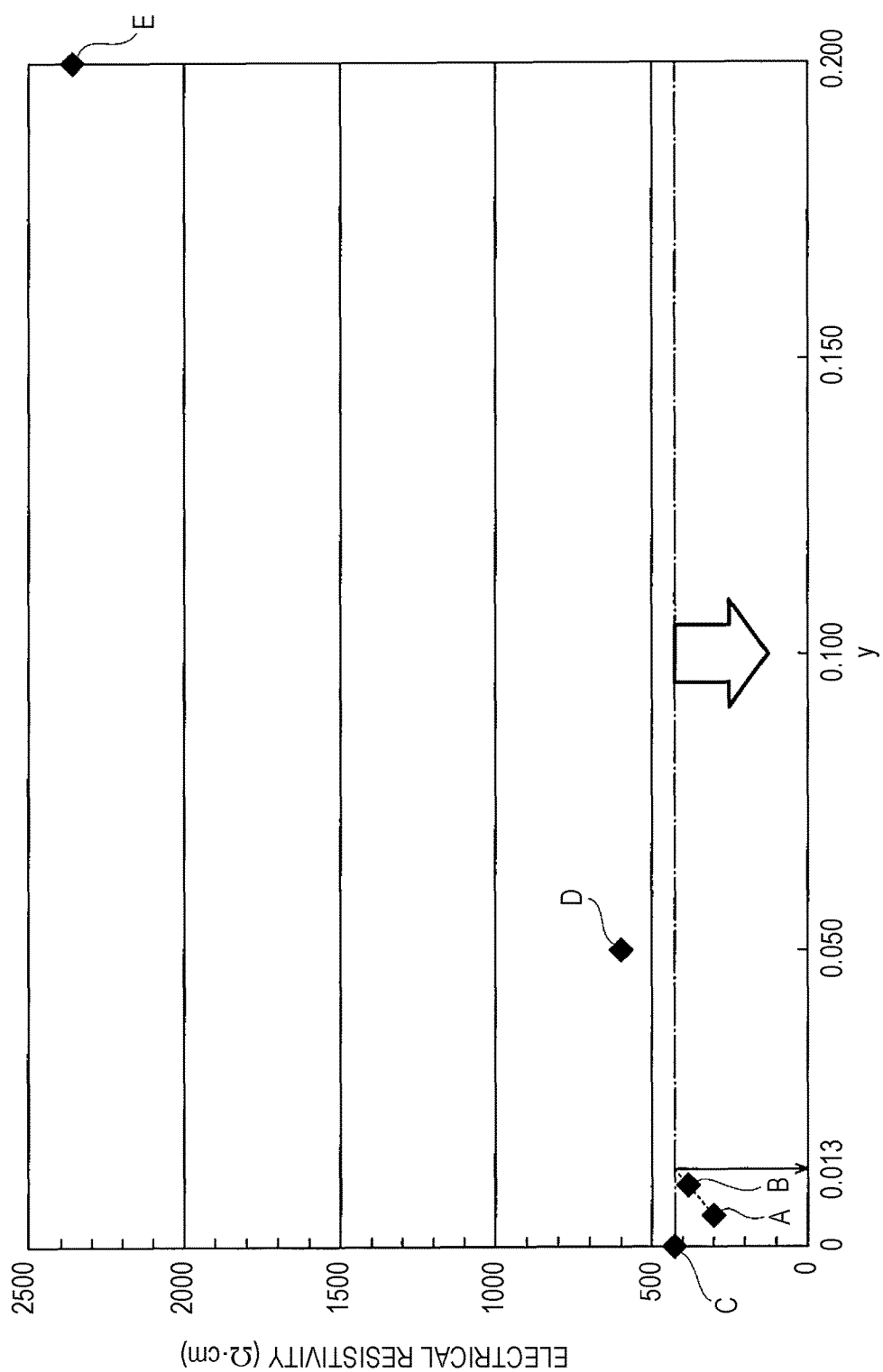

PROTON CONDUCTOR

BACKGROUND

1. Technical Field

The present disclosure relates to a proton conductor.

2. Description of the Related Art

A $BaZrO_3$-based proton conductor has a high proton conductivity in a steam atmosphere and is expected to be applied to, for example, an electrolyte of a solid oxide fuel cell or the like.

A solid electrolyte containing a $BaZrO_3$-based proton conductor has been known that the electrical conductivity of a crystal grain boundary of a polycrystalline substance is lower than that in crystal grains of the polycrystalline substance. Hence, for example, when a solid electrolyte containing a $BaZrO_3$-based proton conductor is used as an electrolyte material of a solid oxide fuel cell, there has been a problem in that the entire resistance of the solid electrolyte is increased.

Japanese Unexamined Patent Application Publication No. 2009-23883 has disclosed a proton conductor ($BaZr_{1-x-y}Ma_xMb_yO_3$) in which Zr of $BaZrO_3$ is substituted by elements Ma and Mb (the element Ma is at least one type of element selected from Y, Ho, Er, Tm, Yb, and Lu; the element Mb is at least one type of element selected from Sc, and In; and $0<x<1$, $0<y<1$, $0<x+y<1$, and $x/y \geq 1$ hold). According to the composition described above, since the crystal grain size of the proton conductor is increased, the rate of the crystal grain boundary to the entire polycrystalline substance is decreased. That is, since the rate of the crystal grain boundary having a higher resistance than that in the crystal grains is decreased, a proton conductor having a low entire resistance can be obtained.

SUMMARY

One non-limiting and exemplary embodiment provides a proton conductor having a low entire resistance and a high proton conductivity. Additional benefits and advantages of the disclosed embodiments will be apparent from the specification and figures. The benefits and/or advantages may be individually provided by the various embodiments and features of the specification and drawings disclosure, and need not all be provided in order to obtain one or more of the same.

In one general aspect, the techniques disclosed here feature: a proton conductor represented by a composition formula of $BaZr_{1-x-y}Y_xIn_yO_3$ in which $0<y\leq0.013$ and $0<x+y<0.5$ hold.

These general and specific aspects may be implemented using a system, a method, and a computer program, and any combination of systems, methods, and computer programs.

The proton conductor according to the present disclosure has an effect capable of exhibiting a low entire resistance and a high proton conductivity.

BRIEF DESCRIPTION OF THE DRAWINGS

FIG. 1 is a flowchart showing one example of a synthesis process of a proton conductor according to an embodiment; and FIG. 2 is a graph showing the relationship between the addition amount of In and an electrical resistivity at 600° C. of a proton conductor according to one example of the embodiment.

DETAILED DESCRIPTION (Way to Obtain One Embodiment of Present Disclosure)

The present inventors carried out an intensive research on the proton conductor disclosed in the above Japanese Unexamined Patent Application Publication No. 2009-23883. As a result, the following finding was obtained.

The present inventors found a phenomenon in which in the proton conductor disclosed in Japanese Unexamined Patent Application Publication No. 2009-23883, the entire resistance of the proton conductor is increased under a specific condition. In particular, the present inventors found a problem in that in a proton conductor represented by a composition formula of $BaZr_{1-x-y}Y_xIn_yO_3$, depending on the amount of In to be added, the entire resistance is increased higher than that of $BaZr_{1-x}Y_xO_3$ in some cases. The reason for this is believed that since the resistance in crystal grains of $BaZr_{1-y}In_yO_3$ in which Zr is substituted by In is higher than that of $BaZr_{1-x}Y_xO_3$ in which Zr is substituted by Y, the entire resistance is increased.

Accordingly, as for the proton conductor represented by a composition formula of $BaZrYO_3$, the present inventors examined a proton conductor capable of exhibiting a low entire resistance and a high proton conductivity, and as a result, the present disclosure was made.

That is, through intensive research carried out on the proton conductor represented by the composition formula of $BaZr_{1-x-y}Y_xIn_yO_3$, the present inventors found that when a small amount of In is added in a predetermined range, the entire resistance is decreased. The reason for this is believed as described below. When the addition amount of In is decreased small to a predetermined range, the resistance of the crystal grain boundary of the proton conductor is decreased so as to compensate for or even exceed the increase in resistance in the crystal gains of the proton conductor caused by the addition of In, and as a result, the entire resistance is decreased.

The finding of the present inventors described above has not been disclosed yet and has a novel technical feature. In the present disclosure, in particular, the following aspects will be described.

The proton conductor according to a first aspect of the present disclosure is a proton conductor represented by a composition formula of $BaZr_{1-x-y}Y_xIn_yO_3$, and x and y in the above composition formula satisfy $0<y\leq0.013$ and $0<x+y<0.5$.

In addition, in a proton conductor according to a second aspect of the present disclosure, x and y in the composition formula of the first aspect described above may satisfy $0<x+y\leq0.2$.

In addition, in a proton conductor according to a third aspect of the present disclosure, y in the composition formula of the first or the second aspect described above may satisfy $0<y\leq0.010$.

In addition, in a proton conductor according to a fourth aspect of the present disclosure, y in the composition formula of the third aspect described above may satisfy $0.005\leq y\leq0.010$. Note that the proton conductor of the present disclosure may contain minute amounts of unavoidable impurities. In the course of the production process, impurities may be added unintentionally, or intentionally for certain effects. What is important is that the respective elements of Ba, Zr, Y, In, and O are within the ranges defined by the present disclosure, these constituting a perovskite crystal structure. Therefore, impurities which might stray in during production may be contained.

Hereinafter, concrete examples of the embodiment will be described with reference to the drawings.

Embodiment (Synthesis Treatment)

First, with reference to FIG. 1, a synthesis treatment of a proton conductor according to an embodiment will be described. FIG. 1 is a flowchart showing one example of the synthesis treatment of the proton conductor according to the embodiment.

The proton conductor according to the embodiment was formed by a citrate complex method using a powder containing $Ba(NO_3)_2$ (manufactured by Kanto Chemical Co., Inc.), $Zr(NO_3)_2 \cdot 2H_2O$ (manufactured by Kanto Chemical Co., Inc.), $In(NO_3)_3 \cdot 3H_2O$ (manufactured by Kojundo Chemical Laboratory Co., Ltd.), and $Y(NO_3)_3 \cdot 6H_2O$ (manufactured by Kojundo Chemical Laboratory Co., Ltd.) as a starting raw material (hereinafter collectively referred to as "BZIY" in some cases).

A powder of BZIY mixed at a predetermined weight rate was dissolved in distilled water and stirred (Step S11). Subsequently, 1.5 equivalents of citric acid monohydrate (manufactured by Kanto Chemical Co., Inc.) and 1.5 equivalents of ethylenediamine tetra acetic acid (EDTA) (manufactured by Kanto Chemical Co., Inc.) were added to metal cations (Step S12). Next, stirring was performed at 90° C. (Step S13).

Next, by addition of ammonia water (28%) (manufactured by Kanto Chemical Co., Inc.), pH was controlled at 7 (Step S14). After the pH was controlled, stirring was performed at 95° C. to 240° C. using a hot stirrer, so that the solvent was removed (Step S15). After a solid substance thus obtained was pulverized using a mortar, degreasing was performed at approximately 400° C. (Step S16).

After the degreasing was performed, a powder thus obtained was press-molded into a cylindrical column and was then calcined at 900° C. for 10 hours (Step S17). After the calcination was performed, a roughly pulverized powder was received in a plastic container with zirconia-made balls and was then pulverized with ethanol by a ball mill for 4 days or more (Step S18).

After the pulverization was performed by the ball mill, the solvent was removed by lamp drying, and a powder obtained thereby was vacuum-dried at 200° C. (Step S19). After the vacuum drying was performed, molding was performed at a press pressure of 200 MPa by cold isostatic pressing to form a rectangular column having a size of approximately 3.0× 2.5×10.5 mm (Step S20), and firing (final firing) was then performed at 1,600° C. for 10 hours, so that a sintered body was obtained (Step S21). By the use of the sintered body formed by the synthesis process described above, the evaluation of the electrical conductivity of the proton conductor according to this embodiment and the composition analysis thereof are performed.

(Evaluation of Electrical Conductivity)

First, a method for evaluating the electrical conductivity of the proton conductor according to this embodiment will be described.

After the surface of the sintered body obtained by the above "synthesis process" was polished, the size thereof was measured using a micrometer, so that dimensional factors used for the electrical resistivity measurement were obtained. In addition, the volume of the sintered body was measured by an Archimedes method, so that the density was obtained.

The electrical resistivity measurement of the proton conductor according to this embodiment was performed using a four-terminal alternating current impedance measurement (related standard: JIS R1661). After a platinum past was applied to the above rectangular column sintered body, firing was performed at 1,000° C. for 2 hours, so that a measurement sample was obtained.

The alternating current impedance measurement was performed at 600° C., a frequency of 32 MHz to 1 Hz, and an amplitude of 100 mV in a 19° C.-wet hydrogen atmosphere. For the alternating current impedance measurement, a 1260 type impedance analyzer manufactured by Solartron was used. In addition, in the four-terminal alternating current impedance measurement, when two arcs are measured in the first quadrant, an X value at the intersection between the second arc and the X axis is regarded as the resistance, and when one arc is measured in the first quadrant, an X value at the intersection between the first arc and the X axis is regarded as the resistance. In addition, the electrical resistivity of the proton conductor is calculated from the following equation (1).

(Electrical Resistivity ($\Omega \cdot cm$))=(Resistance ($\Omega$) obtained by Alternating Current Impedance Measurement)×(Electrode Area ($cm^2$))/(Distance (cm) Between Electrodes)     (1)

(Composition Analysis)

Next, a composition analysis method of the proton conductor according to this embodiment will be described.

The composition analysis of the proton conductor according to this embodiment was performed using an inductively coupled plasma (ICP) emission spectroscopic analysis. For the ICP emission spectroscopic analysis, an iCAP6300 emission spectroscopic analyzer manufactured by Thermo Fisher Scientific was used. After the alternating current impedance measurement was performed, the sintered body was partially cut away and pulverized, and a nitric acid or a hydrochloric acid was added to a powder obtained thereby. Subsequently, by performing a microwave treatment using a closed type microwave sample decomposition device, the sintered body was fused, so that a measurement sample was obtained. As the microwave sample decomposition device, a Topwave manufactured by Analytics JANA was used.

By the ICP emission spectroscopic analysis, the quantitative analysis of four components, that is, Ba, Zr, Y, and In, contained in the proton conductor was performed.

The crystal grain size of the proton conductor according to this embodiment was obtained in such a way that after the sintered body was embedded in a resin and then polished, the cross section thereof obtained by etching using a colloidal silica was imaged using a scanning electron microscope (SEM), and analysis of the image was performed using an image analysis software (Image-Pro Plus manufactured by Media Cybernetics). In addition, the crystal grain size of the proton conductor in this embodiment indicates the average value (average maximum crystal grain diameter) of the maximum diameters of crystal grains. In addition, as the scanning electron microscope (SEM), a scanning electron microscope S-4800 manufactured by Hitachi Ltd. was used.

EXAMPLES

Hereinafter, proton conductors according to examples of the embodiment will be described. In addition, the following examples each show one example of the proton conductor of the embodiment, and it is not to be understood that the proton conductor according to the present disclosure is limited to the proton conductors according to the examples.

The proton conductors according to the examples were each a proton conductor represented by a composition formula of $BaZr_{1-x-y}Y_xIn_yO_3$, and two types of proton conductors, that is, a proton conductor A in which $x=0.195$ and $y=0.005$ held and a proton conductor B in which $x=0.190$ and $y=0.010$ held, were used. In addition, as comparative examples, three types of proton conductors were used, that is, a proton conductor C in which in the above composition formula, $x=0.200$ and $y=0$ held, a proton conductor D in which $x=0.150$ and $y=0.050$ held, and a proton conductor E in which $x=0$ and $y=0.200$ held were used.

As the proton conductors according to the examples and the comparative examples, sintered bodies formed by the synthesis treatment described above were used. In addition, those sintered bodies had a relative density of 95% or more.

conductors D and E according to the comparative examples in which the addition amount of In is larger than that of each of the proton conductors A and B according to the examples is higher than that thereof. That is, in the case in which the addition amount of In was in a predetermined range, that is, in the case in which in the composition formula, $0<y \leq 0.013$ held, the decrease in electrical resistivity was observed.

In addition, the measured compositions of the proton conductors A and B according to the examples and the proton conductors C, D, and E according to the comparative examples were obtained by an ICP emission spectroscopic analysis, and the crystal grain sizes of the proton conductors A to E were obtained by analysis of SEM images. The results are shown in the following Table. In addition, the proton conductors may contain Hf which is impurity derived from raw materials such as $Zr(NO_3)_2 \cdot 2H_2O$ in weight ratio of about 1-4% to Zr. In addition, the proton conductors may contain impurities such as Fe, Cr, Al, Mg, or Ti in weight ratio of about 0.001% to Zr.

TABLE

| MATERIAL (CHARGED COMPOSITION) | MEASURED COMPOSITION | AVERAGE MAXIMUM CRYSTAL GRAIN DIAMETER (μm) | ELECTRICAL RESISTIVITY (Ω · cm) |
|---|---|---|---|
| <PROTON CONDUCTOR C> $BaZr_{0.800}Y_{0.200}O_3$ (x = 0.200, y = 0) | $Ba_{1.017}Zr_{0.796}Y_{0.204}O_3$ | 0.8 | 424 |
| <PROTON CONDUCTOR A> $BaZr_{0.800}Y_{0.195}In_{0.005}O_3$ (x = 0.195, y = 0.005) | $Ba_{1.014}Zr_{0.797}In_{0.005}Y_{0.198}O_3$ | 0.9 | 292 |
| <PROTON CONDUCTOR B> $BaZr_{0.800}Y_{0.190}In_{0.010}O_3$ (x = 0.190, y = 0.010) | $Ba_{1.015}Zr_{0.796}In_{0.010}Y_{0.194}O_3$ | 0.9 | 371 |
| <PROTON CONDUCTOR D> $BaZr_{0.800}Y_{0.150}In_{0.050}O_3$ (x = 0.150, y = 0.050) | $Ba_{1.009}Zr_{0.798}In_{0.049}Y_{0.153}O_3$ | 1.2 | 607 |
| <PROTON CONDUCTOR E> $BaZr_{0.800}In_{0.200}O_3$ (x = 0, y = 0.200) | $Ba_{1.014}Zr_{0.801}In_{0.199}O_3$ | 1.0 | 2372 |

An alternating current impedance measurement was performed on the sintered body at 600° C. in a 19° C.-wet hydrogen atmosphere, so that the electrical resistivity of the proton conductor was measured. The measurement results are shown in FIG. 2. FIG. 2 is a graph showing the relationship between the addition amount of In and the electrical resistivity at 600° C. of the proton conductor according to the example of the embodiment. In addition, in the graph shown in FIG. 2, the horizontal axis represents the amount of In added to the proton conductor. That is, along the horizontal axis of the graph shown in FIG. 2, the addition amount of In is 0 at the left end and is gradually increased toward the right side. In addition, the vertical axis represents the electrical resistivity. That is, along the vertical axis shown in FIG. 2, the electrical resistivity is 0 at the bottom end and is gradually increased toward the upper side.

As shown in FIG. 2, as for the electrical resistivity of the proton conductor according to the example, it was found that the electrical resistivity of the proton conductor (such as one of the proton conductors A and B according to the examples) in which in the composition formula, $y \leq 0.013$ holds is lower than the electrical resistivity of the proton conductor (such as the proton conductor C according to the comparative example) in which in the composition formula, no In is added, that is, in which $y=0$ holds. On the other hand, it was found that the electrical resistivity of each of the proton Table shows the relationship among the measured composition, the average maximum crystal grain diameter, and the electrical resistivity of each of the proton conductor A and B according to the examples of the embodiment and the proton conductors C, D, and E according to the comparative examples. In addition, the average maximum crystal grain diameter is the average of the maximum grain diameters of crystals of the proton conductor which is a polycrystalline substance. In addition, the electrical resistivity shown in Table is an electrical resistivity of the proton conductor measured under the conditions described above (at 600° C. in a 19° C.-wet hydrogen atmosphere).

As shown in Table, it was found that the correlation between the crystal grain size and the electrical resistivity of the proton conductor was not observed. Although the crystal grain size of the proton conductor was not substantially changed even if the addition amount of In was changed, the electrical resistivity of the proton conductor was decreased as the addition amount of In was increased in a range in which $y \leq 0.005$ held, and the electrical resistivity of the proton conductor was increased as the addition amount of In was increased in a range in which $0.005<y$ held.

From the results described above, in the proton conductor represented by the composition formula of $BaZr_{1-x-y}Y_xIn_yO_3$, the mechanism in which the electrical resistivity is decreased by addition of a small amount of In is believed different from the mechanism disclosed in Japanese Unexamined Patent Application Publication No. 2009-23883.

That is, according to Japanese Unexamined Patent Application Publication No. 2009-23883, as described above, since the crystal grain size of the proton conductor is increased, the rate of the crystal grain boundary having a higher resistance than that in the crystal grains is decreased with respect to the entire crystal, so that the entire resistance of the proton conductor is decreased. On the other hand, in the examples according to the embodiment, even when the crystal grain size was changed by addition of In to BaZrYO$_3$, an electrical resistivity corresponding to the crystal grain size was not obtained, and the correlation therebetween was not observed. From the results described above, it is believed that in the proton conductor represented by the composition formula of BaZr$_{1-x-y}$Y$_x$In$_y$O$_3$, by addition of a small amount of In, the resistance of the crystal grain boundary of the proton conductor is decreased. In particular, it is believed that when the addition amount of In is set to be small in a predetermined range, since the resistance of the crystal boundary is decreased so as to compensate for or even exceed the increase in resistance in the crystal grains of the proton conductor caused by the addition of In, the entire resistance of the proton conductor is decreased.

The decrease in resistance will be described in more detail. It is believed that the resistance of the crystal grain boundary of the proton conductor represented by the composition formula of BaZr$_{1-x}$Y$_x$O$_3$ is primarily caused by plus charges segregated in the crystal grain boundary. That is, the mechanism in which the resistance of the crystal grain boundary is decreased by addition of In is believed that plus charges segregated in the crystal grain boundary are alleviated by addition of In. That is, it is believed that the grain boundary resistance is generated by the decrease in proton concentration in BaZr$_{1-x}$Y$_x$O$_3$, and at the same time, it is also believed that when In is added, since a reaction of reducing In proceeds, the decrease in proton concentration is suppressed, and as a result, the grain boundary resistance is decreased.

In addition, in order to obtain a high conductivity, the type of element to be added and the dopant concentration are important parameters. Hence, in the proton conductor represented by the composition formula of BaZr$_{1-x-y}$Y$_x$In$_y$O$_3$, in order to obtain a high conductivity, the values of x and y of Y$_x$ and In$_y$ in the composition formula each may be set in a predetermined range. For example, according to Jian Wu, "Defect Chemistry and Proton Conductivity in Ba-based Perovskites", Ph.D. thesis, California Institute of Technology, 2005 (Defended Oct. 27, 2004), P119-P123, it has been known that the range may be set so that 0<x+y<0.5 holds. In addition, from an experimental point of view, it has been confirmed that the range may be set so that 0<x+y≤0.2 holds. Accordingly, in the proton conductors according to those examples, the values of x and y each may also be selected from the range in which 0<x+y<0.5 holds. Alternatively, the values of x and y each may be selected from the range in which 0<x+y≤0.2 holds.

As described above, in the proton conductor represented by the composition formula of BaZr$_{1-x-y}$Y$_x$In$_y$O$_3$, when x and y in the composition formula satisfy 0<x<0.5, 0<y≤0.013, and 0<x+y<0.5, the effect capable of exhibiting a low entire resistance and a high proton conductivity can be obtained.

In addition, the value of x+y in the composition formula may also satisfy 0<x+y≤0.2.

In addition, the value of y in the composition formula may also satisfy 0<y≤0.010 or furthermore may satisfy 0.005≤y≤0.010.

In addition, although the proton conductor according to this embodiment was formed by a citrate complex method, the formation method is not limited thereto, and another method, such as a solid phase sintering method, a co-precipitation method, a nitrate salt method, or a spray granulation method, may also be used. In addition, a film forming method, such as a CVD method or a sputtering method, may also be used. In addition, the formation may also be performed by spraying. The shape of the proton conductor formed thereby is also not particularly limited, and any shape, such as a bulky form or a membrane, may be used.

The proton conductor according to the present disclosure may be applied to, for example, an electrochemical device, such as a fuel cell, a gas sensor, or a water electrolysis apparatus.

What is claimed is:
1. A proton conductor represented by a composition formula of Ba$_z$Zr$_{1-x-y}$Y$_x$In$_y$O$_3$
wherein
the value of z is not less than 1.014 and not more than 1.015;
the value of x is not less than 0.194 and not more than 0.198; and
the value of y is not less than 0.005 and not more than 0.01.

* * * * *